(12) United States Patent
Matthews et al.

(10) Patent No.: US 7,248,848 B2
(45) Date of Patent: Jul. 24, 2007

(54) COMMUNICATION APPARATUS INCLUDING DUAL TIMER UNITS

(76) Inventors: Phillip M. Matthews, 7009 Nubian La., Austin, TX (US) 78739; Frederick A. Rush, 10913 Mint Julep Dr., Austin, TX (US) 78748; G. Diwakar Vishakhadatta, 2909 Hillview Rd., Austin, TX (US) 78703

( * ) Notice: Subject to any disclaimer, the term of this patent is extended or adjusted under 35 U.S.C. 154(b) by 305 days.

(21) Appl. No.: 10/881,167

(22) Filed: Jun. 30, 2004

(65) Prior Publication Data
US 2006/0004938 A1    Jan. 5, 2006

(51) Int. Cl.
*H04B 1/10* (2006.01)
(52) U.S. Cl. .................. 455/296; 455/310; 455/63.1; 327/295; 327/296
(58) Field of Classification Search ............... 455/574, 455/296, 310, 63.1; 327/291, 295, 296
See application file for complete search history.

(56) References Cited

U.S. PATENT DOCUMENTS

| | | | |
|---|---|---|---|
| 4,384,361 A | 5/1983 | Masaki | |
| 4,805,165 A | 2/1989 | Kawamura et al. | |
| 4,870,699 A | 9/1989 | Garner et al. | |
| 4,879,758 A | 11/1989 | DeLuca et al. | |
| 4,930,126 A | 5/1990 | Kazecki et al. | |
| 4,996,639 A | 2/1991 | Ishimoto et al. | |
| 5,031,233 A | 7/1991 | Ragan | |
| 5,058,203 A | 10/1991 | Inagami | |
| 5,142,699 A | 8/1992 | Sato et al. | |
| 5,150,361 A | 9/1992 | Wieczorek et al. | |
| 5,151,769 A | 9/1992 | Immorlica, Jr. et al. | |
| 5,241,541 A | 8/1993 | Farrell et al. | |
| 5,280,644 A | 1/1994 | Vannatta et al. | |
| 5,307,066 A | 4/1994 | Kobayashi et al. | |
| 5,355,524 A | 10/1994 | Higgins, Jr. | |
| 5,444,407 A * | 8/1995 | Ganapathy et al. ......... 327/295 |
| 5,448,755 A | 9/1995 | Tanaka | |
| 5,471,471 A | 11/1995 | Freeburg et al. | |

(Continued)

FOREIGN PATENT DOCUMENTS

| EP | 00463621 A1 | 1/2000 |
|---|---|---|
| EP | 00463621 B1 | 1/2000 |
| FR | 2 775 853 | 9/1999 |

OTHER PUBLICATIONS

U.S. Appl. No. 10/426,042, filed Apr. 29, 2003, Sooch et al.

(Continued)

*Primary Examiner*—Duc M. Nguyen
*Assistant Examiner*—Aung T. Win
(74) *Attorney, Agent, or Firm*—Peter Zawilski (57) ABSTRACT

A communication apparatus includes a radio frequency circuit that operates on a radio frequency signal and a digital processing circuit coupled to the radio frequency circuit. The digital processing circuit includes a first timing circuit that provides timed signals to control timing of system operations during an active mode of operation of the digital processing circuit, and a second timing circuit that provides timing signals to control timing of system operations during an active mode of operation of the radio frequency circuit. In one particular embodiment, at least a portion of the first timing circuit is disabled when the radio frequency circuit is active (receiving and/or transmitting).

61 Claims, 8 Drawing Sheets

U.S. PATENT DOCUMENTS

| | | | |
|---|---|---|---|
| 5,471,663 | A | 11/1995 | Davis |
| 5,475,684 | A | 12/1995 | Shimizu |
| 5,519,711 | A | 5/1996 | Sointula |
| 5,604,928 | A | 2/1997 | Hamano et al. |
| 5,630,224 | A * | 5/1997 | Swail .................. 455/296 |
| 5,649,160 | A | 7/1997 | Corry et al. |
| 5,758,278 | A | 5/1998 | Lansdowne |
| 5,764,693 | A | 6/1998 | Taylor et al. |
| 5,812,936 | A | 9/1998 | DeMont |
| 5,838,741 | A | 11/1998 | Callaway, Jr. et al. |
| 5,842,037 | A * | 11/1998 | Haartsen .................. 710/1 |
| 5,872,540 | A | 2/1999 | Casabona et al. |
| 5,875,449 | A | 2/1999 | Ono |
| 5,917,854 | A | 6/1999 | Taylor et al. |
| 5,920,592 | A | 7/1999 | Tanaka et al. |
| 5,923,761 | A | 7/1999 | Lodenius |
| 5,953,640 | A | 9/1999 | Meador et al. |
| 6,020,614 | A | 2/2000 | Worley |
| 6,243,597 | B1 | 6/2001 | Daanen |
| 6,246,335 | B1 | 6/2001 | Tsunoda |
| 6,366,622 | B1 | 4/2002 | Brown et al. |
| 6,480,553 | B1 | 11/2002 | Ho et al. |
| 6,498,819 | B1 | 12/2002 | Martin |
| 6,510,185 | B2 | 1/2003 | Lee et al. |
| 2002/0080728 | A1 | 6/2002 | Sugar et al. |
| 2003/0020521 | A1 | 1/2003 | Lee et al. |
| 2004/0042541 | A1 | 3/2004 | Kazuhiro |
| 2005/0062525 | A1 * | 3/2005 | Imamura .................. 327/563 |

OTHER PUBLICATIONS

Written Opinion of the International Searching Authority, International Application PCT/US2005/023043, Jan. 18, 2007.

Notification of Transmittal of the International Search Report and the Written Opinion of the International Searching Authority, International Application No. PCT/US2005/023043, Oct. 5, 2005.

International Search Report, International Application No. PCT/US2005/023043, Oct. 5, 2005.

Written Opinion of the International Searching Authority, International Application No. PCT/US2005/023043, Oct. 5, 2005.

* cited by examiner

COMMUNICATION APPARATUS INCLUDING DUAL TIMER UNITS

BACKGROUND OF THE INVENTION

1. Field of the Invention

This patent document relates generally to communication apparatus including radio frequency (RF) circuits and, more particularly, to timer units within communication apparatus.

2. Description of the Related Art

High performance wireless communication apparatus such as RF receivers, transmitters, and transceivers typically include RF front-end circuitry that operates on an RF signal being received or transmitted. For example, the front-end circuitry may down-convert a received RF signal to baseband and/or up-convert a baseband signal for RF transmission.

The RF front-end circuitry typically includes analog circuits such as low noise amplifiers and mixers that have a relatively high sensitivity to noise and interference. The RF circuitry in some applications, such as in mobile communication cellular handsets, may be required to detect signals as small as a few micro-volts or less in amplitude. It is thus often important to minimize noise and interference from sources external or even internal to the communication apparatus.

In addition to the RF front-end circuitry, typical wireless communication apparatus may also include digital processing circuitry that performs various digital functions including, for example, low level baseband signal processing, implementation of the communication protocol stack, and various user interface functionality. The digital processing circuitry may include a variety of specific hardware such as a DSP (digital signal processor), an MCU (microcontroller unit), hardware accelerators, memory, and/or I/O interfaces, among numerous other specific hardware devices.

Unfortunately, the digital processing circuitry of a typical communication apparatus can be a significant source of detrimental noise and interference. More particularly, the digital processing circuitry in a typical high performance communication apparatus produces digitals signals with relatively small rise and fall times, or with fast transitions or sharp edges. Furthermore, those signals often have relatively high frequencies. As a result, their Fourier series or transforms have rich harmonic contents. The harmonics, or higher-frequency Fourier series components, cause spurious emissions that may interfere with, and may adversely impact, the performance of the RF front-end circuitry. Thus, in many systems, the RF front-end circuitry is implemented on an integrated circuit die that is separate from the integrated circuit die on which the digital processing circuitry is implemented. Additionally, the RF front-end circuitry and digital processing circuitry are often placed in separate electrical cavities, where the shielding of the cavities helps to isolate the electrical and magnetic coupling.

Implementing the RF front-end circuitry and the digital processing circuitry on separate dies, however, has several disadvantages, such as increased component count, size, and overall cost, and more potential for decreased reliability and increased manufacturing failures. It is thus desirable to allow integration of the RF front-end circuitry and digital processing circuitry on a single integrated circuit die without significant degradation and performance due to interference.

SUMMARY OF THE INVENTION

Various embodiments of a communication apparatus and methods employing dual timer units are disclosed. In one embodiment, a communication apparatus includes a radio frequency circuit that operates on a radio frequency signal and a digital processing circuit coupled to the radio frequency circuit. The digital processing circuit includes a first timing circuit that provides timed signals to control timing of system operations during an active mode of operation of the digital processing circuit, and a second timing circuit that provides timing signals to control timing of system operations during an active mode of operation of the radio frequency circuit.

In one particular embodiment, at least a portion of the first timing circuit is disabled when the radio frequency circuit is active (receiving or transmitting). During radio activity, various other portions of the digital processing circuit may also be placed in a shutdown mode. The first timing circuit may be configured to send a signal to the second timing circuit indicating a change from the active mode of operation of the digital processing circuit to an active mode of operation of the radio frequency circuit. The second timing circuit may be configured to send a signal causing disablement of at least a portion of the first timing circuit during the active mode of operation of the radio frequency circuit.

In another embodiment, a mobile phone includes a radio frequency transceiver that operates on a radio frequency signal and a digital processing circuit coupled to the radio frequency transceiver. The digital processing circuit includes a first timing circuit configured to provide timed signals controlling timing of system operations during an active mode of operation of the digital processing circuit, and a second timing circuit configured to provide timed signals controlling timing of system operations during an active mode of operation of the radio frequency transceiver.

In yet another embodiment, a communication apparatus includes a radio frequency circuit configured to operate on a radio frequency signal and a digital processing circuit coupled to the radio frequency circuit. The digital processing circuit includes a first timing circuit configured to provide timed signals controlling timing of system operations during a shutdown mode of operation of the RF circuit, and a second timing circuit configured to provide timed signals controlling timing of system operations during an active mode of operation of the radio frequency circuit.

In still a further embodiment, a mobile phone includes a radio frequency transceiver that operates on a radio frequency signal and a digital processing circuit coupled to the radio frequency transceiver. The radio frequency transceiver and the digital processing circuit are fabricated on a single integrated circuit chip. The digital processing circuit includes a first timing circuit configured to provide timed signals controlling timing of system operations during a shutdown mode of operation of the radio frequency transceiver, and a second timing circuit configured to provide timed signals controlling timing of system operations during an active mode of operation of the radio frequency transceiver.

Methods to accomplish the functionality described above are also disclosed.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
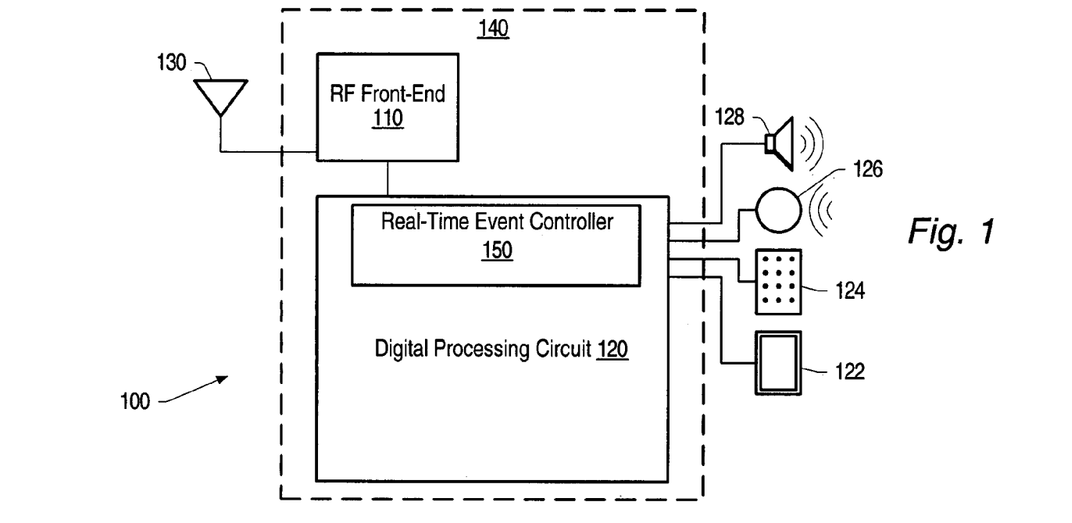
FIG. 1 illustrates a generalized block diagram of a communication apparatus including an RF front-end circuit and a digital processing circuit.

FIG. 1 illustrates a generalized block diagram of a communication apparatus 100 including an RF front-end circuit 110 coupled to a digital processing circuit 120. As shown, various user interfaces including a display 122, a keypad 124, a microphone 126, and a speaker 128 may be coupled to digital processing circuit 120, depending upon the specific application of communication apparatus 100 and its desired functionality. An antenna 130 is also shown coupled to RF front-end circuit 110. Digital processing circuit 120 contains a real time event controller (RTEC) 150 for controlling timing of various system events.

Communication apparatus 100 is illustrative of various wireless devices including, for example, mobile and cellular phone handsets, machine-to-machine (M2M) communication networks (e.g., wireless communications for vending machines), so-called "911 phones" (a mobile handset configured for calling the 911 emergency response service), as well as devices employed in emerging applications such as 3G, satellite communications, and the like. As such, communication apparatus 100 may provide RF reception functionality, RF transmission functionality, or both (i.e., RF transceiver functionality).

Communication apparatus 100 may be configured to implement one or more specific communication protocols or standards, as desired. For example, in various embodiments communication apparatus 100 may implement the Global System for Mobile Communications (GSM) standard, the Personal Communications Service (PCS) standard, the Digital Cellular System (DCS) standard, the General Packet Radio Service (GPRS) standard, and/or the Enhanced General Packet Radio Service standard (E-GPRS), which may also be referred to as the Enhanced Data for GSM Evolution (EDGE) standard, among others.

RF front-end circuit 110 may accordingly include circuitry to provide the RF reception capability and/or RF transmission capability. In one embodiment, front-end circuit 110 may down-convert a received RF signal to baseband and/or up-convert a baseband signal for RF transmission. RF front-end circuit 110 may employ any of a variety of architectures and circuit configurations, such as, for example, low-IF receiver circuitry, direct-conversion receiver circuitry, direct up-conversion transmitter circuitry, and/or offset-phase locked loop (OPLL) transmitter circuitry, as desired. RF front-end circuit 110 may additionally employ a low noise amplifier (LNA) for amplifying an RF signal received at antenna 130 and/or a power amplifier for amplifying a signal to be transmitted from antenna 130. In alternative embodiments, the power amplifier may be provided external to RF front-end circuit 110.

Digital processing circuit 120 may provide a variety of signal processing functions, as desired, including baseband functionality. For example, digital processing circuit 120 may be configured to perform filtering, decimation, modulation, demodulation, coding, decoding, correlation and/or signal scaling. In addition, digital processing circuit 120 may perform other digital processing functions, such as implementation of the communication protocol stack and/or control of user I/O operations and applications. To perform such functionality, digital processing circuit 120 may include various specific circuitry, such as a software programmable MCU and/or DSP, as well as a variety of specific peripheral circuits such as memory controllers, direct memory access (DMA) controllers, hardware accelerators, voice coder-decoders (CODECs), UARTs (universal asynchronous receiver transmitters), and user interface circuitry. The choice of digital processing hardware (and firmware/software, if included) depends on the design and performance specifications for a given desired implementation, and may vary from embodiment to embodiment.

Figure 2:
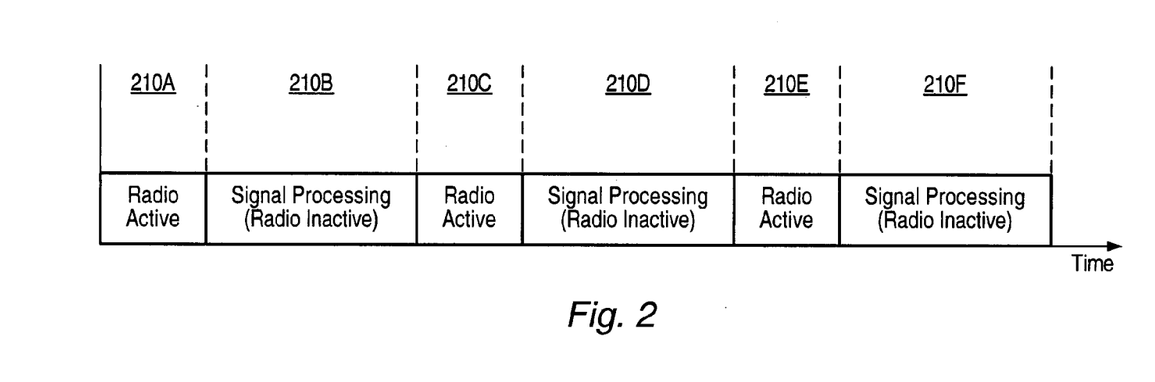
FIG. 2 illustrates a set of events that occur in a communication apparatus according to time domain isolation.

In one embodiment, RF front-end circuit 110 and digital processing circuit 120 may be integrated on the same integrated circuit die 140. To reduce interference and thus accommodate high performance functionality, communication apparatus 100 may implement a technique referred to as time domain isolation, or TDI. FIG. 2 illustrates a set of events that occur in communication apparatus 100 according to time domain isolation. Broadly speaking, two alternative events take place in such a system: RF reception or transmission, and signal processing. The system arranges in time the RF reception or transmission activities and the signal processing activities so as to avoid or reduce interference between the RF front-end circuit 110 and the digital processing circuit 120.

As shown in FIG. 2, communication apparatus 100 employs a plurality of timeslots 210A-210F, and so on. During RF timeslots 210A, 210C and 210E, RF front-end circuit 110 may receive RF signals, process the received signals, and store the results. Subsequently, during signal processing timeslots 210B, 210D and 210F, respectively, digital processing circuit 120 may perform signal processing tasks on the stored results.

Alternatively, during RF timeslots 210A, 210C and 210E, RF front-end circuit 110 may transmit RF signals. Thus, in this mode of operation, during signal processing timeslots 210B and 210D, digital processing circuit 120 performs signal processing tasks on input data (e.g., voice, data), and stores the results. Subsequently, during RF timeslots 210C and 210E, respectively, RF front-end circuit 110 may perform RF operations on the stored results (for example, up-conversion) and transmit an RF signal. As will be described further below, in one embodiment RTEC 150 is configured to generate precisely timed signals to control transitions between timeslots.

It is noted that, depending on the specific protocol, architecture, and circuitry used, communication apparatus may receive and transmit simultaneously, as desired. More commonly, however, the system either transmits signals or receives signals during any one of RF time-slots 210A, 210C, 210E, etc. For example, a GSM-compliant system or apparatus, such as a mobile telephone that complies with the GSM specifications, either receives or transmits RF signals in one or more bursts of activity during each of RF time-slots 210A, 210C, 210E, etc.

It is further noted that the RF time-slots may have the same or different durations, as desired. RF time-slots may have unequal lengths so as to accommodate a wide variety of circuitry, systems, protocols, and specifications, as desired.

Similarly, the signal-processing time-slots may have similar or dissimilar durations, as desired. Each of signal-processing time-slots 210B, 210D, 210F, etc. may include several other time-slots or time divisions, depending on the particular communication protocol and/or signal-processing techniques and the particular circuitry and technology used. For example, a signal-processing time-slot may include several time-slots, with a portion or a particular circuit of digital processing circuit 120 actively processing signals during one or more of the time-slots.

To implement time domain isolation, digital processing circuit 120 may be placed in a shutdown mode of operation when an RF timeslot commences (i.e., when the radio is active). In one embodiment, during the shutdown mode of operation, a clock signal or signals within digital processing circuit 120 are disabled or inhibited. More specifically, by using static metal oxide semiconductor (MOS) circuitry, for example, the clock signal or signals within the digital processing circuit 120 may be shut down without losing data present within that circuitry. Accordingly, the digital processing circuit 120 can preserve the data within it while the RF front-end circuit 110 is active. Once the RF front-end circuit 110 has completed its reception or transmission (e.g., an RF timeslot has ended), the shutdown mode of digital processing circuit 120 may be discontinued by re-enabling the clock signal or signals. Digital processing operations on the data may then continue or commence. By disabling the clock or clocks in digital processing circuit 120 while RF front-end circuit 110 is active (i.e., receiving or transmitting), the amount of digital noise and thus spurious signals at the RF band of interest may be reduced, thus accommodating high performance.

It is noted that although FIG. 2 depicts the operation of the RF front-end circuit 110 and the digital processing circuit 120 as alternative events, these operations need not be mutually exclusive. Generally, it may be desirable to reduce or minimize the amount of overlap between the operation of the RF front-end circuit 110 and the digital processing circuit 120. Depending on a number of factors, however, the active operation of RF front-end circuit 110 and signal processing operations of digital processing circuit 120 may overlap to a certain extent.

It is also noted that in some alternative embodiments, the shutdown mode of digital processing circuit 120 may be implemented by causing at least portions of the circuitry to be held inactive or to be otherwise inhibited using other techniques (i.e., other than by disabling a clock signal(s)). For example, power may be removed from particular circuitry within digital processing circuit 120. Likewise, flip-flops or other circuits may be disabled (e.g., through an enable input). In addition, it is noted that some portions of the digital processing circuit 120, such as dynamic memory, may remain active during the shutdown mode (i.e., the circuitry of digital processing circuitry 120 may be partially powered down, disabled, or inhibited during the shutdown mode).

In addition to other elements of digital signal processing circuit 120, RTEC 150 may also be a source of interference that may adversely impact the performance of RF front-end circuit 110. Thus, to further reduce interference while RF front-end circuit 110 is active, in one embodiment a portion of RTEC 150 may also be placed in a shutdown mode of operation during periods of RF activity. More particularly, in one embodiment RTEC 150 may include a main timer unit and a separate RF timer unit that are collectively employed to control timing of system events. During periods of RF activity, the RF timer unit may be used to control timing of selected system events, while the main timer unit is placed in a shutdown mode. Further details regarding aspects of specific embodiments of RTEC 150 are provided below.

Figure 3:
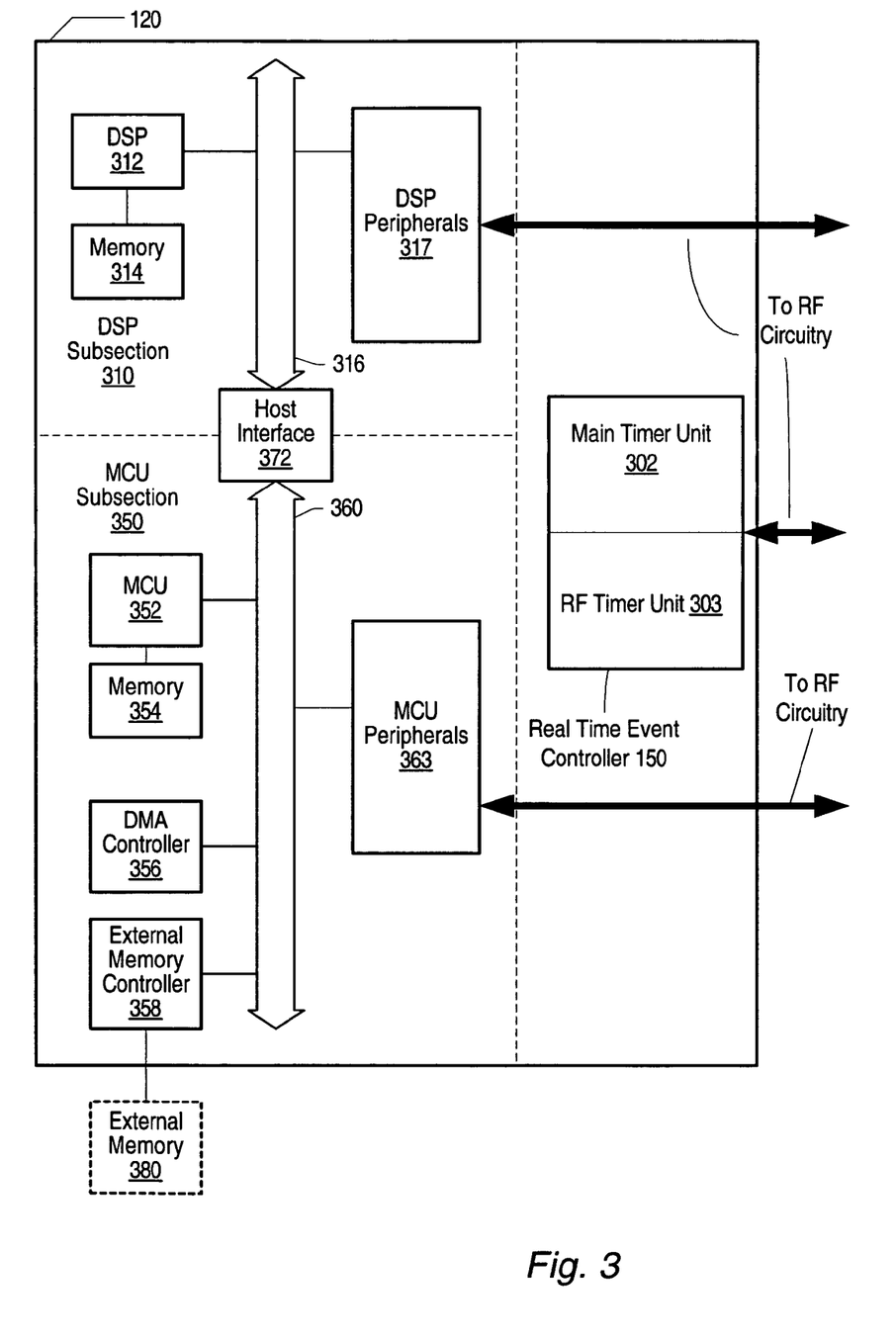
FIG. 3 illustrates a block diagram of an example of an implementation of circuitry within a digital processing circuit.

FIG. 3 illustrates an example of an implementation of circuitry within one specific embodiment of digital processing circuit 120. In the embodiment of FIG. 3, digital processing circuit 120 includes a DSP subsection 310, an MCU section 350, and RTEC 150.

As shown, DSP subsection 310 may include a DSP core 312 coupled to an associated memory 314. Various DSP peripheral devices 317 may be coupled to DSP core 312 through one or more buses 316. In one embodiment, DSP peripherals 317 may include a hardware accelerator, an audio CODEC, a receive buffer, and a transmit buffer. It is noted that the specific number and types of peripheral devices provided within DSP subsection 310 may vary depending upon the application as well as the desired functionality and performance.

MCU subsection 350 includes an MCU core 352 coupled to an associated memory 354. Various peripherals including a DMA controller 356 and an external memory controller 358 are shown coupled to MCU 352 through one or more buses 360. Additional MCU peripherals 363 are further shown coupled to bus 360. In one embodiment, peripherals 363 may include a universal asynchronous receiver-transmitter (UART), a real time clock, a keypad I/F, and an interrupt controller. It is noted that various alternative peripherals may be provided, as desired, depending upon the desired functionality. In some embodiments, for example, RTEC 150 may itself be implemented as an MCU peripheral device.

A host interface 372 is further shown for accommodating communications between DSP subsection 310 and MCU subsection 350. An external memory 380 is shown coupled to external memory controller 358. External memory 380 may comprise, for example, SRAM, flash, EEPROM, and/or other types of memory. It is noted that various additional external components (not shown in FIG. 3) may be coupled to digital processing circuit 120 including, for example, a keypad, a display, and interface cards such a SIM card, etc.

During operation, DSP subsection 310 may process data received from RF front-end circuit 110 through a receive buffer included among DSP peripherals 317. DSP subsection 310 may likewise provide processed data to a transmit buffer included among DSP peripherals 317, which is then conveyed to RF front-end circuit 110 through a digital-to-analog converter (DAC). Another DSP peripheral such as an audio CODEC may receive an audio signal from an external microphone or provide an audio signal to a speaker. In some implementations, other DSP peripherals such as a hardware accelerator may perform various low-level signal processing functions such as, for example, filtering, decimation, modulation, demodulation, coding, decoding, correlation and/or signal scaling, as desired.

In one embodiment, MCU subsection 350 is provided to perform higher-level processing functionality. For example, in one implementation, MCU subsection 350 may provide functionality to support the communication protocol stack and the housekeeping tasks as described previously. MCU subsection 350 may additionally implement interfaces such as an MMI (man-machine-interface) and may provide an execution environment for applications running in the system. The configuration of FIG. 3 may embody a baseband circuit of, for example, a mobile telephone and/or modem. In one embodiment, digital processing circuit 120 implements both the GSM communication standard as well as the GPRS standard.

The RTEC 150 of FIG. 3 includes a main timer unit 302 and an RF timer unit 303. During operation, RTEC 150 maintains a system time value that is synchronized with a base station with which communication system 100 communicates. Main timer unit 302 may be configured to control timing of system events during signal-processing time-slots (such as 210B, 210D and 210F in FIG. 2), and RF timer unit 303 may be configured to control the timing of system events during RF time-slots (such as 210A, 210C and 210E). As described in greater detail below, the precise timing of the starting and ending of time-slots 210A-F may also be controlled by signals generated by main timer unit 302 and RF timer unit 303. To reduce interference between the RF circuitry and the digital processing circuitry in accordance with the TDI techniques described above, in the embodiment shown in FIG. 3, at least a portion of the circuitry included in main timer unit 302 is disabled during RF time-slots. (Other circuitry within digital processing circuit 120 may also be disabled during RF time-slots, as described earlier.) During such periods when main timer 302 is disabled, RF timer unit 303 is responsible for providing timed signals used to control timing of system events.

Figure 4:
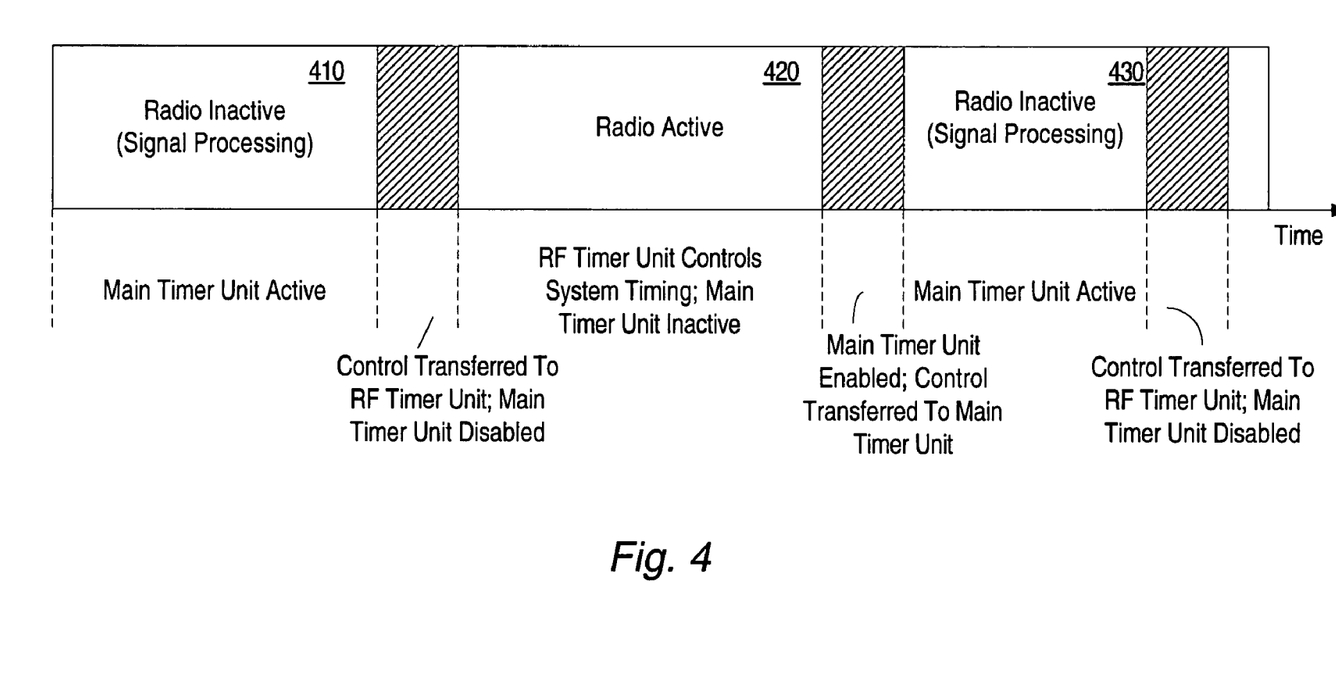
FIG. 4 illustrates a sequence of operations of a main timer unit and an RF timer unit.

FIG. 4 illustrates a sequence of operations of main timer unit 302 and RF timer unit 303 during successive periods of signal processing and RF activity. Main timer unit 302 manages timing of system events during signal processing periods. As shown in FIG. 4, upon completion of a period of signal processing (410), during which RF front-end circuit 110 is inactive, control is transferred from main timer unit 302 to RF timer unit 303, and main timer unit 302 is disabled. During a period when RF front-end circuit 110 is active (420), main timer unit 302 remains disabled while RF timer unit 303 manages timing of certain system events. At the end of a period of RF activity, main timer unit 302 is again enabled and control for timing system events is passed back to main timer unit 302 for the successive signal processing period (430). Further details regarding control of system event timing by main timer unit 302 and RF timer unit 303 are provided below.

It is noted that various implementation techniques may be used to disable main timer unit 302 in different embodiments, similar to the techniques described above for disabling other components of digital processing circuit 120. For example, in some embodiments, clock signals used by main timer unit 302 may be disabled. In addition, it is also noted that not all of the circuitry comprising main timer unit need be disabled or inhibited during periods of RF activity; that is, the circuitry of main timer unit 302 may be partially powered down, disabled, or inhibited during such periods.

Figure 5:
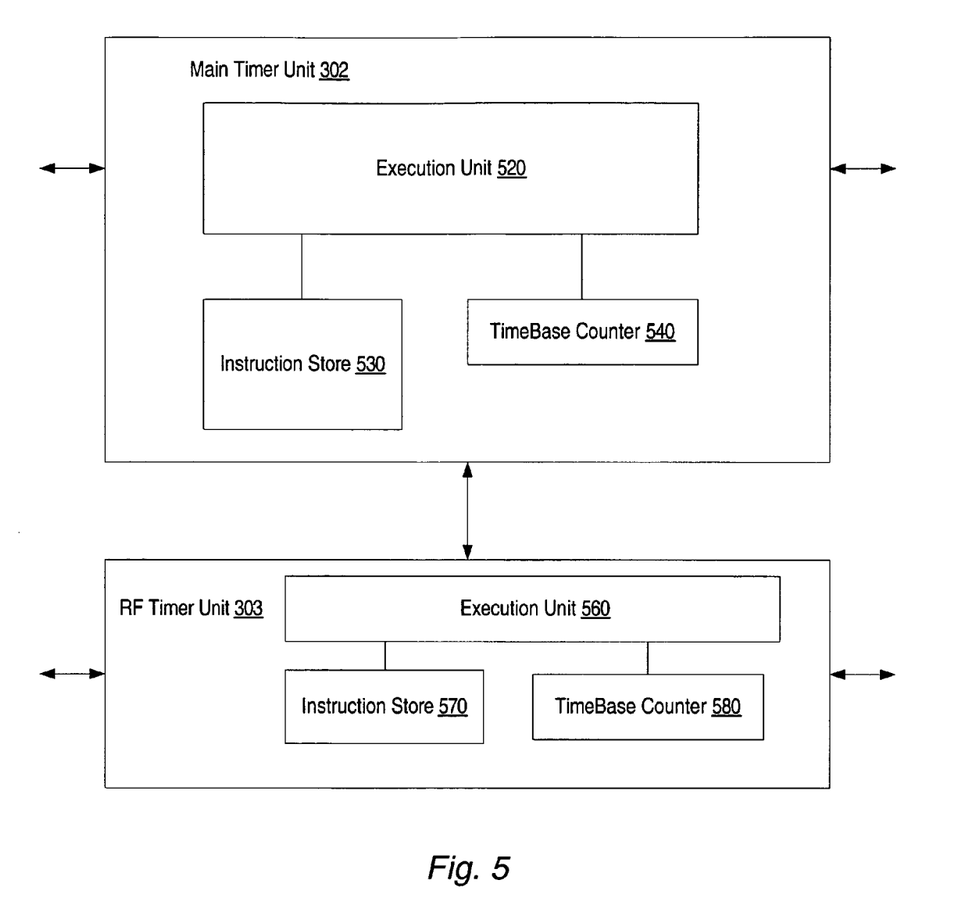
FIG. 5 illustrates details of one embodiment of a main timer unit and an RF timing unit.

Main timer unit 302 and RF timer unit 303 may be implemented in a variety of ways in different embodiments. In one embodiment, shown in FIG. 5, main timer unit 302 includes an execution unit 520, an instruction store 530, and a timebase counter 540. RF timer unit 303 includes a second execution unit 560, a second instruction store 570 and a second timebase counter 580. In this embodiment, main timer unit 302 and RF timer unit 303 generate signals that control the timing of system events in response to execution of instructions. Execution unit 520 may be capable of executing instructions from a first instruction set, and execution unit 560 may be capable of executing instructions from a second instruction set. Such a use of programmable instructions to control the operation of main timer unit 302 and RF timer unit 303 may provide a flexible mechanism to support a range of functionality in different communication devices. In some embodiments, the first and second instruction sets may include specific instructions to send interrupts to other components of the digital processing circuit, such as an MCU or a DSP, for example to prepare the other components for an impending RF time-slot during which the other components may be partly or fully disabled. It is noted that in some embodiments, the first instruction set may differ from the second. It is also noted that the number of different instructions executable by RF timer unit 303 may be relatively small, thus allowing for a relatively small circuit implementation (in comparison to, e.g., the circuit implementation of execution unit 520). In addition, the total number of instructions actually executed by RF timer unit 303 during operation may be relatively low; thus, instruction store 570 may be smaller in overall size than instruction store 530. Accordingly, the complexity of RF timer unit 303 may be less than that of main timer unit 302, and the overall amount of circuitry required to implement RF timer unit 303 may be smaller than the amount of circuitry required for main timer unit 302.

In one embodiment, MCU 352 (FIG. 3) may download a sequence of instructions (e.g., stored in memory 354) into instruction store 530 periodically. The times at which MCU 352 downloads instructions may vary with different communication protocols and/or implementations. In an embodiment where communication apparatus 100 implements the GSM standard, for example, MCU 352 may download instructions at the beginning of each GSM frame. A system time value maintained in timebase counter 540 may be used to schedule instruction executions by execution unit 520. Such instructions may include, for example, an instruction whose execution results in the generation of an interrupt signal to MCU 352 and/or DSP 312, indicative of an impending change from an active mode of the digital processing circuit to a shutdown mode of the digital processing circuit. In response to such an interrupt signal, MCU 352 and/or DSP 312 may perform operations to prepare for the shutdown mode of operation of the digital processing circuit. In some embodiments, using the instruction set supported by main timer unit 302, main timer unit 302 may be programmed to transfer a second sequence of instructions to instruction store 570. RF timer unit 303 may be configured to provide timed signals in response to execution of the second sequence of instructions by execution unit 560. In such embodiments, execution unit 560 may schedule instruction execution using a value of system time maintained in timebase counter 580, or by using some other mechanism such as a delta time technique described below. In some embodiments, the second sequence of instructions may be a subset of the sequence of instructions downloaded by MCU 352 into instruction store 530.

As described above, main timer 302 may be disabled during an active mode of operation of the RF front-end circuit 110 to reduce interference with RF circuitry. Thus, in such embodiments, control over generating timed signals for timing system events is passed from main timer unit 302 to RF timer unit 303 before main timer unit 302 is disabled. Control over the maintenance of system time may further be transferred in a synchronized manner from main timer unit 302 to RF timer unit 303. In one embodiment, this may be achieved by loading the contents of timebase counter 540 into timebase counter 580. Upon completion of the active mode of operation of RF front-end circuit 110, control of system timing is passed back to main timer unit 302. In one specific embodiment, these transfers of control are implemented using two specific instructions in an instruction set supported by main timer unit 302 and RF timer unit 303: a transfer-to-RF-unit instruction and a transfer-to-main-unit instruction.

Figure 6:
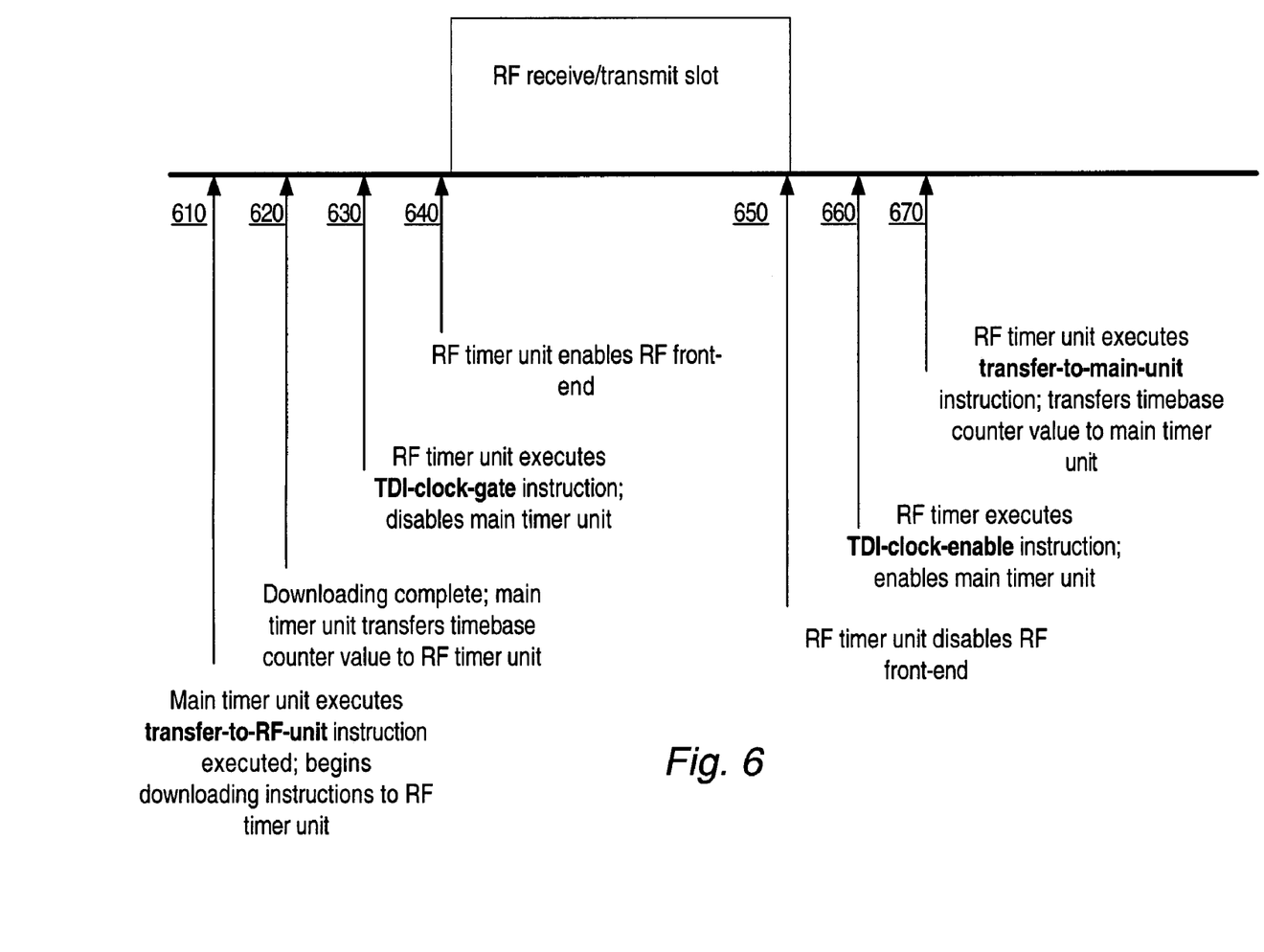
FIG. 6 illustrates details of transitions between a shut-down mode of an RF circuit and an active mode of an RF circuit.
Figure 7:
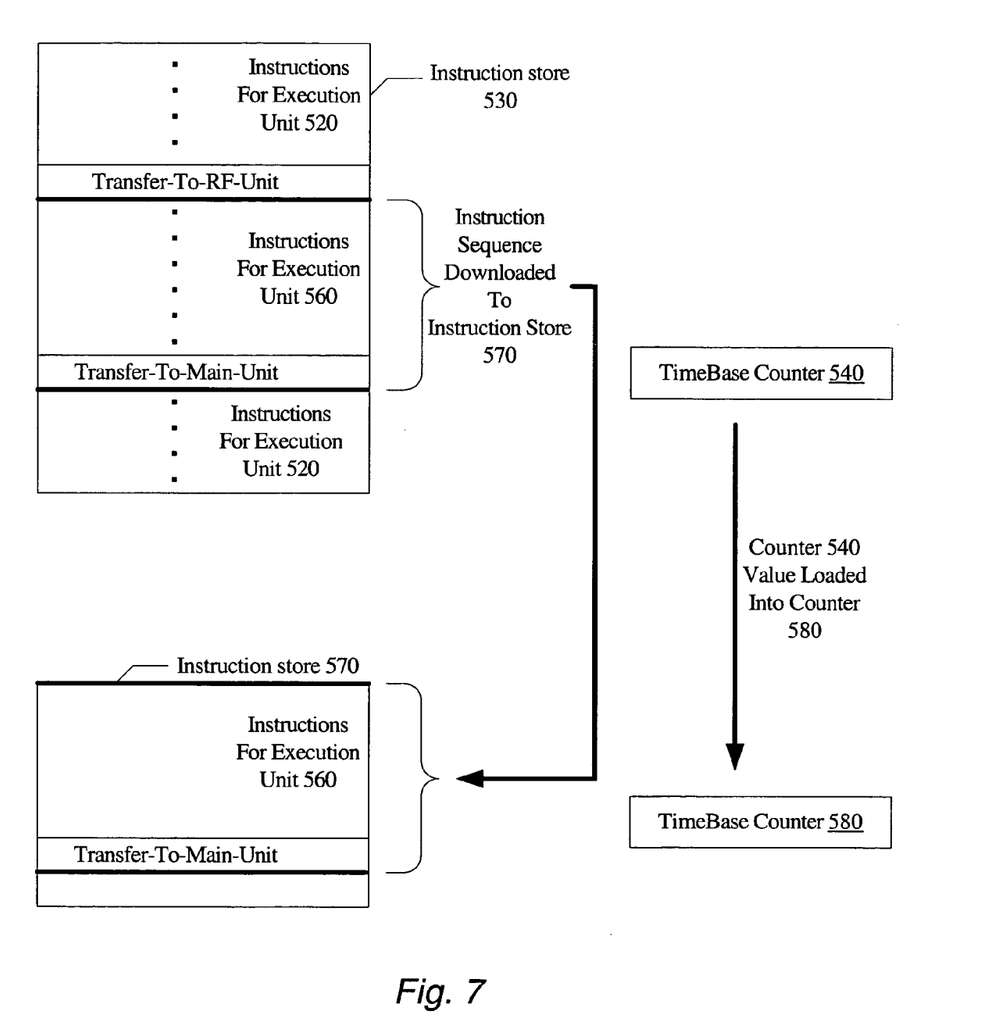
FIG. 7 illustrates operations performed in response to an execution of a transfer-to-RF-unit instruction in one embodiment.

FIG. 6 shows additional details of a transition from a shutdown mode of operation of RF front-end circuit 110 to an active mode and from the active mode back to a shutdown mode for one specific embodiment of main timer unit 302 and RF timer unit 303. In general, instructions downloaded by MCU 352 into instruction store 530 may include a variety of instructions, arranged in a sequence designed to accomplish a desired functionality. In such a sequence, a transfer-to-RF-unit instruction may be followed by one or more other instructions, which may be in turn be followed by a transfer-to-main-unit instruction. In one specific embodiment, execution of a transfer-to-RF-unit instruction may generate a signal that may cause (at time 610 in FIG. 6) main timer unit 302 to download a sequence of instructions in the instruction stream between the transfer-to-RF-unit instruction and a subsequent transfer-to-main-unit instruction (including the transfer-to-main-unit instruction) into instruction store 570. Further, upon completion of the downloading, the execution of the transfer-to-RF-unit instruction may also cause the value stored in timebase counter 540 to be loaded into timebase counter 580 (time 620 in FIG. 6). These two operations—the downloading of instructions into instruction store 570, and the loading of timebase counter 580—performed in response to an execution of a transfer-to-RF-unit instruction, are illustrated in FIG. 7. It is noted that in other embodiments, instructions to be executed by execution unit 560 may be provided directly from a source (e.g., MCU 352) rather than indirectly through instruction store 530.

After timebase counter 580 is loaded with the value from timebase counter 540 as described above, timebase counter 580 may continue to increment at a rate required to maintain an accurate value for system time. Execution unit 560 may begin executing the instructions downloaded into instruction store 570. The instructions in instruction store 570 may include a specific instruction, such as a TDI-clock-gate instruction, whose execution may result in a signal disabling at least a part of main timer unit 302, as illustrated at time 630 in FIG. 6. Other components of digital processing circuit 120 may also be disabled at time 630 in response to the signal. A variety of techniques may be used to disable the main timer unit 302 and other components of the digital processing circuit 120, including gating clocks, as described earlier. After main timer unit 302 is disabled, execution unit 560 may continue execution of instructions downloaded into instruction store 570 to manage timing of system events during an RF time-slot. The execution of such instructions by execution unit 560 may, for example, result in antenna switches being enabled to begin RF operations (time 640 in FIG. 6), receive buffers for storing RF data being advanced, and gain changes being made in various circuitry. RF front-end circuit 110 may be operating to receive RF signals during a given RF time-slot, to transmit RF signals, or to both receive and transmit RF signals, as illustrated in FIG. 6.

The timing of execution of instructions by execution unit 560 may be controlled in a variety of ways in different implementations. For example, in one implementation, an instruction may be timed to execute when timebase counter 580 reaches a specific time value. In other implementations, a second counter for maintaining delta times (time values relative to the time when a previous instruction was executed) may be maintained in RF timer unit 303, and instructions may be timed for execution by instruction engine 560 using such delta times. In one such implementation, each instruction in the instruction set supported by instruction execution unit 560 may include a field encoding the desired delta time at which the instruction should be executed, relative to the execution of the previous instruction.

It is noted that in some embodiments, a global clock or clocks may be used to support the maintenance of timebase values with high precision in counters 540 and 580. In one implementation, counter 540 may be configured to increment at a rate that is proportional to the clock rate of a more precise global clock: e.g., counter 540 may be incremented once for every four clocks of the global clock. In such an implementation, the transfer of contents of timebase counter 540 to timebase counter 580 may be accompanied by a corresponding transfer of a global clock value to an additional counter in RF timer unit 303. This transfer may be accomplished in a synchronized manner with respect to the global clock (i.e., within one cycle of the global clock) to maintain system time with a high degree of precision. Further, the transfer may occur at any cycle of the global clock within the time taken to increment timebase counter 540; for example, if timebase counter 540 is incremented once for every four clocks of a global clock, the transfer could occur at any one of the four global clock transitions that occur while timebase counter 540 contains a particular value of system time.

When the receive and/or transmit operations of the RF time-slot are complete, the RF timer unit may generate a signal or signals (e.g., in response to a specific instruction) disabling the RF front-end (at time 650 in FIG. 6) in some embodiments. Execution unit 560 may further execute a specific instruction, such as a TDI-clock-enable instruction, that results in a signal which enables portions of digital processing circuit 120, including main timer unit 302 (at time 660 in FIG. 6), that had been disabled during the RF time-slot. The enablement of the digital processing circuit 120 may be accomplished in some embodiments by enabling clock signals, as described earlier. In some embodiments, as described above, a transfer-to-main-unit instruction may then be executed by execution unit 560 to transfer control for timing system operations back to main timer unit 302 (time 670 in FIG. 6). Execution of a transfer-to-main-unit instruction in such an embodiment may result in timebase counter 540 being loaded with the current value in timebase counter 580, and control being transferred back to main timer unit 302. Thus, main timer unit 302 may resume the execution of any instructions remaining in instruction store 530 beyond the transfer-to-RF-unit instruction.

Figure 8:
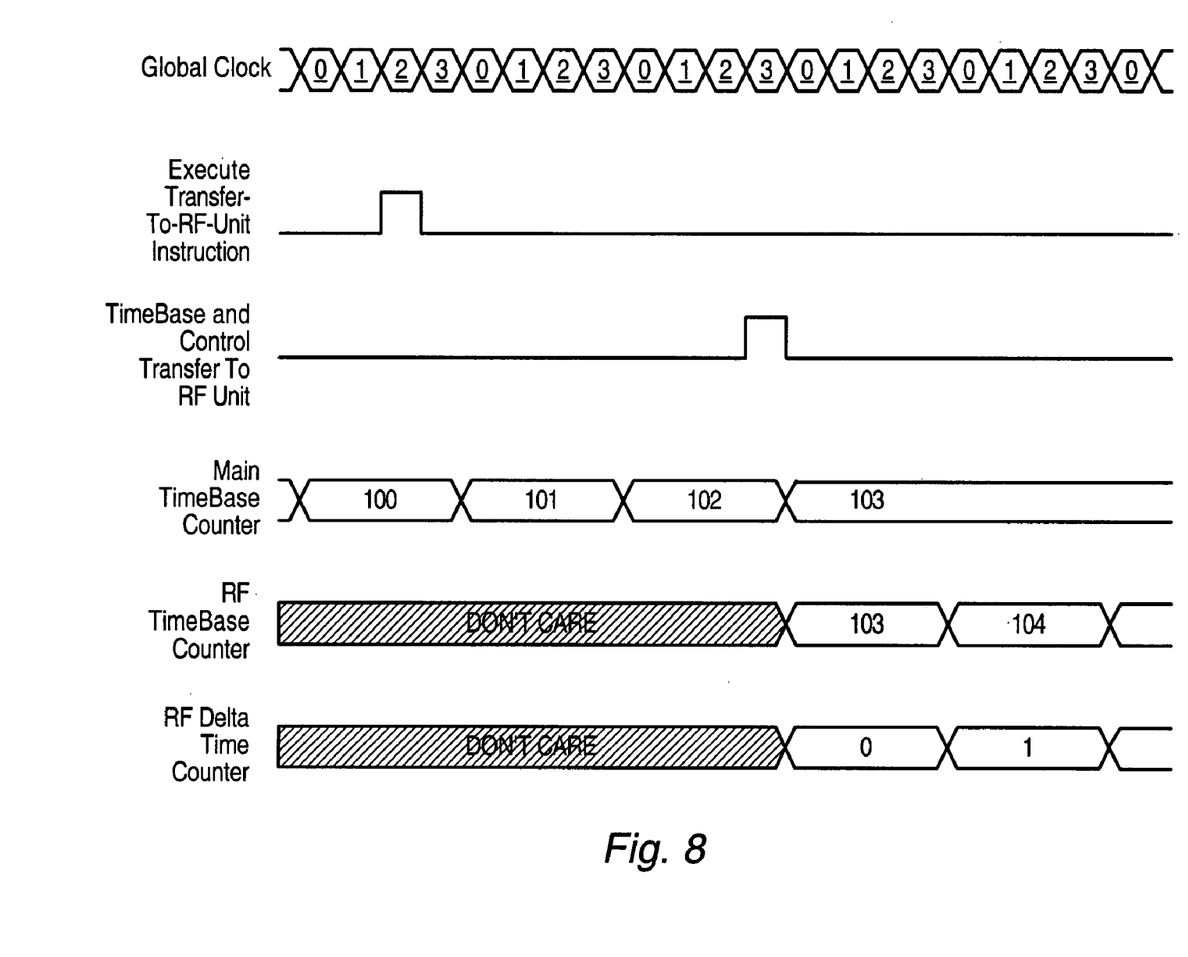
FIG. 8 illustrates a timing of a transfer of control from a main timer unit to an RF timer unit.

FIG. 8 shows a timing diagram of timebase counter value transfer from main timer unit 302 to RF timer unit 303 in response to execution of a transfer-to-RF-unit instruction in one specific embodiment. In this embodiment, the loading of system time values from timebase counter 540 to timebase counter 580, and from timebase counter 580 to timebase counter 540, occurs without any timing slip, that is, within a single cycle of a global system clock. At main timebase counter value "100", a transfer-to-RF-unit instruction is executed by execution unit 520, starting a download of instructions from main timer unit 302 to RF timer unit 303. Downloading is completed when the main timebase counter reaches value "103" in the illustrated example; at this point, the value "103" is loaded into timebase counter 580 in the RF timer unit. The time required for downloading instructions may vary in different embodiments; for example, it may be determined based on the size of instruction store 570, that is, based on the maximum number of instructions that can be downloaded to RF timer unit in a specific implementation. Timebase counter 580 then maintains system time while the main timer unit may be disabled; that is, at any given time, timebase counter 580 has the same value that timebase counter 540 would have had, if timebase counter 540 had not been disabled. In the implementation illustrated in FIG. 8, timing of instruction execution in RF timer unit 303 is controlled using a delta time counter as described earlier. The delta time counter is reset when timebase counter 580 is loaded, as shown in FIG. 8, where the delta time counter is set to "0" when timebase counter 580 is set to "103". The delta time counter may also be reset when an instruction is executed by execution unit 560.

Figure 9:
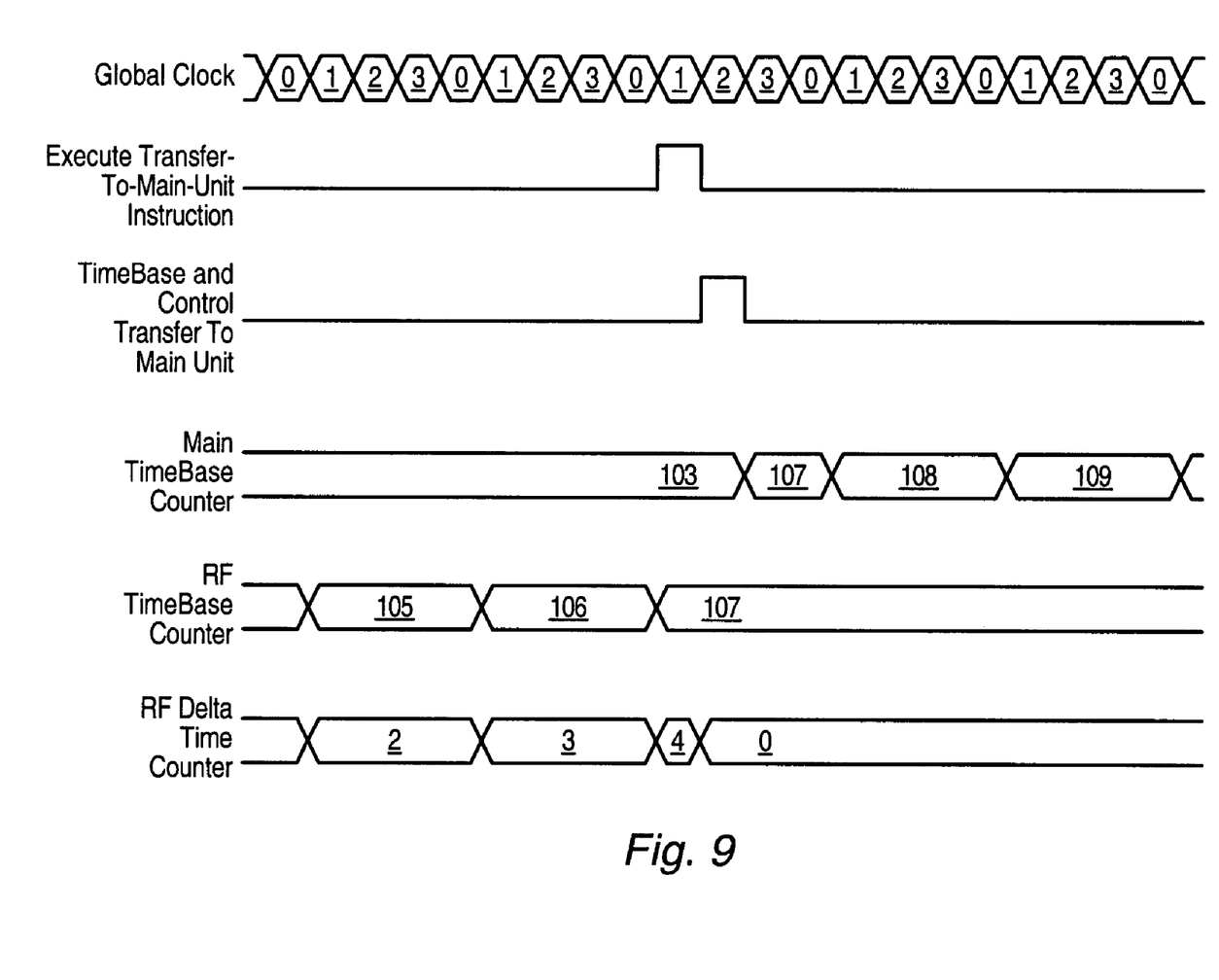
FIG. 9 illustrates a timing of a transfer of control from an RF timer unit to a main timer unit.

Upon completion of an active RF mode of operation, control and timing may be transferred back to main timer unit 302 from RF timer unit 303 using a transfer-to-main-unit instruction as described above. The timing of such a transfer is illustrated in FIG. 9 for one embodiment. In some embodiments, instruction store 530 may already contain any remaining instructions that may need to be executed by main timer unit 302, so instructions may not need to be transferred back from RF timer unit 303 to main timer unit 302. As shown in FIG. 9, the timebase counter value ("107") may be transferred from timebase counter 580 to timebase counter 540 at a first clock signal after a transfer-to-main-unit instruction is executed by execution unit 560. FIG. 9 also shows that a delta time counter may be reset to "0" when the transfer-to-main-unit instruction is executed.

It is noted that aspects of main timer unit 302 and RF timer unit 303 may vary in different embodiments. In one embodiment, a subset of the circuitry used for performing some of the operations of main timer unit 302 described earlier may also be used for performing some of the operations of RF timer unit 303; that is, certain functionality of the two timer units may be implemented using common circuitry. In another embodiment, a portion (or all) of the circuitry forming RF timer unit 303 may be disabled during signal processing time-slots, just as a portion of main timer unit 302 may be disabled during RF time-slots.

It is also noted that a signal indicating a change from a shutdown mode of operation of front-end RF circuit 110 to an active mode of operation may be generated in various other ways, for example using a third timer unit or a peripheral device, or in response to a change made in the value of a configuration register by an MCU. In addition, in some embodiments, both main timer unit 302 and RF timer unit 303 may be configured to send control signals to a common destination; for example both timer units may be configured to provide signals to set and reset antenna configurations. Components within main timer unit 302 and RF timer unit 303 may be implemented using a variety of techniques. For example, instruction stores 530 and 570 may each be implemented as a random-access memory, a first-in-first-out (FIFO) memory, or any other kind of memory that may suit specific system requirements. Main timer unit 302 and RF timer unit 303 may further include other elements, for example timing adjust registers and timebase adjust registers, to support other functionality that may be required (e.g., to advance or retard the RTEC time such that it matches the base station time). Configuration and synchronization of timebase counter 540 may be controlled using other registers in some implementations. In some implementations, instructions loaded into instruction store 530 and/or 570 may need to be sorted based on encoded relative execution times (e.g., by MCU 352).

Various alternative specific implementations of main timer unit 302 and/or RF timer unit 303 are also possible in other embodiments. In some embodiments, main timer unit 302 and/or RF timer unit 303 may control system timing without executing instructions. For example, some implementations of main timer unit 302 and/or RF timer unit 303 may employ hardware state machines (e.g., implemented using a variety of specific circuitry, as desired) that control system timing. In addition, in some alternative embodiments, operations of main timer unit 302 and RF timer unit 303 may be independent of other components of digital processing circuit 120, such as MCU 352.

Finally, while the embodiment of FIG. 3 includes a DSP 512 and an MCU 352, embodiments are also possible that employ other digital processing circuits. For example, some embodiments may employ one or more DSPs in the place of MCU 352. Likewise, embodiments are possible that employ one or more MCUs (or CPUs), without a DSP. Still further embodiments may employ programmable logic devices (PLDs) or other hardware circuits in place of MCU 352.

In addition, it is noted that in some alternative embodiments, RF front-end circuit 110 may transmit and/or receive continuously. In such embodiments, dual timers as described above may also be utilized to reduce interference during certain periods of RF activity (e.g., a main timer unit may be disabled while an RF timer unit controls system timing).

Although the embodiments above have been described in considerable detail, numerous additional variations and modifications will become apparent to those skilled in the art once the above disclosure is fully appreciated. It is intended that the following claims be interpreted to embrace all such variations and modifications.

What is claimed is:

1. A communication apparatus comprising:
   a radio frequency (RF) circuit configured to operate on a radio frequency signal, and
   a digital processing circuit coupled to the RF circuit, wherein the digital processing circuit includes a first timing circuit and a second timing circuit;
   wherein the first timing circuit is configured to provide timed signals controlling timing of system operations during an active mode of operation of the digital processing circuit, and wherein the second timing circuit is configured to provide timed signals controlling timing of system operations during an active mode of operation of the RF circuit; and
   wherein a time value is transferred from the first timing circuit to the second timing circuit to synchronize a transfer of control of the timing of system operations to the second timing circuit.

2. The communication apparatus as recited in claim 1, wherein at least a portion of the first timing circuit is disabled during the active mode of operation of the RF circuit.

3. The communication apparatus as recited in claim 2, wherein portions of the digital processing circuit in addition to the first timing circuit are disabled during the active mode of operation of the RF circuit.

4. The communication apparatus as recited in claim 3, wherein the portions of the digital processing circuit are disabled in response to a signal generated by the second timing circuit.

5. The communication apparatus as recited in claim 2, wherein the at least a portion of the first timing circuit is disabled in response to a signal generated by the second timing circuit.

6. The communication apparatus as recited in claim 2, wherein the at least a portion of the first timing circuit is disabled by a signal that disables one or more clocks that clock the first timing circuit.

7. The communication apparatus as recited in claim 2, wherein the active mode of operation of the RF circuit is a transmission mode of operation.

8. The communication apparatus as recited in claim 2, wherein the active mode of operation of the RF circuit is a reception mode of operation.

9. The communication apparatus as recited in claim 2, wherein the at least a portion of the first timing circuit disabled during the active mode of operation of the RF circuit is enabled during the active mode of operation of the digital processing circuit.

10. The communication apparatus as recited in claim 9, wherein the at least a portion of the first timing circuit is enabled in response to a signal generated by the second timing circuit.

11. The communication apparatus as recited in claim 9, wherein at least a portion of the first timing circuit is enabled during the active mode of operation of the digital processing circuit by a signal that enables one or more clocks that clock the first timing circuit.

12. The communication apparatus as recited in claim 2, wherein the second timing circuit is configured to provide the timed signals during the active mode of operation of the RF circuit in response to a signal indicative of a change from the active mode of operation of the digital processing circuit to the active mode of operation of the RF circuit.

13. The communication apparatus as recited in claim 12, wherein the signal indicative of the change from the active mode of operation of the digital processing circuit to the active mode of operation of the RF circuit is provided by the first timing circuit.

14. The communication apparatus as recited in claim 12, wherein the first timing circuit includes a first counter for maintaining a system time, wherein the second timing circuit includes a second counter for maintaining the system time, wherein contents of the first counter are loaded into the second counter in response to the signal indicative of the change from the active mode of operation of the digital processing circuit to the active mode of operation of the RF circuit.

15. The communication apparatus as recited in claim 14, wherein contents of the second counter are loaded into the first counter in response to a signal indicative of a change from the active mode of operation of the RF circuit to the active mode of operation of the digital processing circuit.

16. The communication apparatus as recited in claim 14, wherein the contents of the first counter are loaded into the second counter with no timing slip, and the contents of the second counter are loaded into the first counter with no timing slip.

17. The communication apparatus as recited in claim 14, wherein the first timing circuit further includes a first instruction execution unit for executing instructions from a first instruction set, and wherein the second timing circuit further includes a second instruction execution unit for executing instructions from a second instruction set.

18. The communication apparatus as recited in claim 17, wherein the first timing circuit is further configured to provide the timed signals controlling timing of system operations during the active mode of operation of the digital processing circuit in response to execution of instructions by the first instruction execution unit, and the second timing circuit is further configured to provide the timed signals controlling timing of system operations during the active mode of operation of the RF circuit in response to execution of instructions by the second instruction execution unit.

19. The communication apparatus as recited in claim 18, wherein the first timing circuit further includes a first instruction store unit, and wherein the second timing circuit further includes a second instruction store unit.

20. The communication apparatus as recited in claim 19, wherein the digital processing circuit further includes a microcontroller unit (MCU), wherein the MCU is configured to download instructions into the first instruction store unit for execution by the first instruction execution unit.

21. The communication apparatus as recited in claim 19, wherein the first timing circuit is further configured to download instructions into the second instruction store unit for execution by the second execution unit.

22. The communication apparatus as described in claim 20, wherein the first timing circuit is further configured to send an interrupt signal to the MCU indicative of a change from an active mode of the digital processing circuit to a shutdown mode of operation of the digital processing circuit.

23. The communication apparatus as described in claim 20, wherein the digital processing circuit further includes a digital signal processor (DSP), and wherein the first timing circuit is further configured to send an interrupt signal to the DSP indicative of a change from an active mode of the digital processing circuit to a shutdown mode of operation of the digital processing circuit.

24. The communication apparatus as described in claim 22, wherein the interrupt signal is generated in response to an execution of an instruction by the first instruction execution unit.

25. The communication apparatus as described in claim 23, wherein the interrupt signal is generated in response to an execution of an instruction by the first instruction execution unit.

26. A method of operating a communication apparatus including a radio frequency (RF) circuit and a digital processing circuit, the method comprising:
   providing timed signals from a first timing circuit controlling timing of system operations during an active mode of operation of the digital processing circuit;
   receiving a signal at a second timing circuit indicative of a change from the active mode of operation of the digital processing circuit to an active mode of operation of the RF circuit;
   synchronizing a transfer of control of the timing of system operations to the second timing circuit by transferring a time value from the first timing circuit to the second timing circuit; and
   providing timed signals from the second timing circuit controlling timing of system operations during the active mode of operation of the RF circuit.

27. A method of operating a communication apparatus including a radio frequency (RF) circuit and a digital processing circuit, the method comprising:

providing timed signals from a first timing circuit controlling timing of system operations during an active mode of operation of the digital processing circuit;

receiving a first signal at a second timing circuit indicative of a change from the active mode of operation of the digital processing circuit to an active mode of operation of the RF circuit;

synchronizing a transfer of control of the timing of system operations to the second timing circuit by transferring a first time value from the first timing circuit to the second timing circuit;

disabling at least a portion of the first timing circuit;

providing timed signals from the second timing circuit controlling timing of system operations during the active mode of operation of the RF circuit;

enabling the portion of the first timing circuit;

receiving a second signal at the first timing circuit indicative of a change from the active mode of operation of the RF circuit to the active mode of operation of the digital processing circuit; and resuming providing timed signals from the first timing circuit controlling timing of system operations in response to the second signal.

28. The method as recited in claim 27, wherein the first signal is generated by the first timing circuit.

29. The method as recited in claim 28, wherein the second signal is generated by the second timing circuit.

30. A communication apparatus comprising:

a radio frequency (RF) circuit configured to operate on a radio frequency signal, and a digital processing circuit coupled to the RF circuit, wherein the digital processing circuit includes a first timing circuit and a second timing circuit;

wherein the first timing circuit is configured to provide timed signals controlling timing of system operations during a shutdown mode of operation of the RF circuit, and wherein the second timing circuit is configured to provide timed signals controlling timing of system operations during an active mode of operation of the RF circuit and wherein a time value is transferred from the first timing circuit to the second timing circuit to synchronize a transfer of control of the timing of system operations to the second timing circuit.

31. The communication apparatus as recited in claim 30, wherein at least a portion of the first timing circuit is disabled during the active mode of operation of the RF circuit.

32. The communication apparatus as recited in claim 31, wherein portions of the digital processing circuit in addition to the first timing circuit are disabled during the active mode of operation of the RF circuit.

33. The communication apparatus as recited in claim 32, wherein the portions of the digital processing circuit are disabled in response to a signal generated by the second timing circuit.

34. The communication apparatus as recited in claim 31, wherein the at least a portion of the first timing circuit is disabled in response to a signal generated by the second timing circuit.

35. The communication apparatus as recited in claim 31, wherein the at least a portion of the first timing circuit is disabled by a signal that disables one or more clocks that clock the first timing circuit.

36. The communication apparatus as recited in claim 31, wherein the at least a portion of the first timing circuit disabled during the active mode of operation of the RF circuit is enabled during the shutdown mode of operation of the RF circuit.

37. The communication apparatus as recited in claim 36, wherein the at least a portion of the first timing circuit is enabled in response to a signal generated by the second timing circuit.

38. The communication apparatus as recited in claim 31, wherein the second timing circuit is configured to provide the timed signals during the active mode of operation of the RF circuit in response to a signal indicative of a change from the shutdown mode of operation of the RF circuit to the active mode of operation of the RF circuit.

39. The communication apparatus as recited in claim 38, wherein the signal indicative of the change from the shutdown mode of operation of the RF circuit to the active mode of operation of the RF circuit is provided by the first timing circuit.

40. A method of operating a communication apparatus including a radio frequency (RF) circuit and a digital processing circuit, the method comprising:

providing timed signals from a first timing circuit controlling timing of system operations during a shutdown mode of operation of the RF circuit;

receiving a signal at a second timing circuit indicative of a change from the shutdown mode of operation of the RF circuit to an active mode of operation of the RF circuit;

synchronizing a transfer of control of the timing of system operations to the second timing circuit by transferring a time value from the first timing circuit to the second timing circuit; and providing timed signals from the second timing circuit controlling timing of system operations during the active mode of operation of the RF circuit.

41. A mobile phone comprising:

a radio frequency (RF) transceiver configured to operate on a radio frequency signal, and a digital processing circuit coupled to the RF transceiver, wherein the digital processing circuit includes a first timing circuit and a second timing circuit;

wherein the first timing circuit is configured to provide timed signals controlling timing of system operations during an active mode of operation of the digital processing circuit, and wherein the second timing circuit is configured to provide timed signals controlling timing of system operations during an active mode of operation of the RF transceiver; and wherein a time value is transferred from the first timing circuit to the second timing circuit to synchronize a transfer of control of the timing of system operations to the second timing circuit.

42. The mobile phone as recited in claim 41, wherein at least a portion of the first timing circuit is disabled during the active mode of operation of the RF transceiver.

43. The mobile phone as recited in claim 42, wherein portions of the digital processing circuit in addition to the first timing circuit are disabled during the active mode of operation of the RF transceiver.

44. The mobile phone as recited in claim 43, wherein the portions of the digital processing circuit are disabled in response to a signal generated by the second timing circuit.

45. The mobile phone as recited in claim 42, wherein the at least a portion of the first timing circuit is disabled in response to a signal generated by the second timing circuit.

46. The mobile phone as recited in claim 42, wherein the at least a portion of the first timing circuit is disabled by a signal that disables one or more clocks that clock the first timing circuit.

47. The mobile phone as recited in claim 42, wherein the at least a portion of the first timing circuit disabled during the active mode of operation of the RF transceiver is enabled during the active mode of operation of the digital processing circuit.

48. The mobile phone as recited in claim 47, wherein the at least a portion of the first timing circuit is enabled in response to a signal generated by the second timing circuit.

49. The mobile phone as recited in claim 42, wherein the second timing circuit is configured to provide the timed signals during the active mode of operation of the RF transceiver in response to a signal indicative of a change from the active mode of operation of the digital processing circuit to the active mode of operation of the RF transceiver.

50. The mobile phone as recited in claim 49, wherein the signal indicative of the change from the active mode of operation of the digital processing circuit to the active mode of operation of the RF transceiver is provided by the first timing circuit.

51. A method of operating a mobile phone including a radio frequency (RF) transceiver and a digital processing circuit, the method comprising:
providing timed signals from a first timing circuit controlling timing of system operations during an active mode of operation of the digital processing circuit;
receiving a signal at a second timing circuit indicative of a change from the active mode of operation of the digital processing circuit to an active mode of operation of the RF transceiver;
synchronizing a transfer of control of the timing of system operations to the second timing circuit by transferring a time value from the first timing circuit to the second timing circuit; and
providing timed signals from the second timing circuit controlling timing of system operations during the active mode of operation of the RF transceiver.

52. A mobile phone comprising:
a radio frequency (RF) transceiver configured to operate on a radio frequency signal, and
a digital processing circuit coupled to the RF transceiver, wherein the digital processing circuit includes a first timing circuit and a second timing circuit;
wherein the first timing circuit is configured to provide timed signals controlling timing of system operations during a shutdown mode of operation of the RF transceiver;
wherein a time value is transferred from the first timing circuit to the second timing circuit to synchronize a transfer of control of the timing of system operations to the second timing circuit;
wherein the second timing circuit is configured to provide timed signals controlling timing of system operations during an active mode of operation of the RF transceiver; and
wherein the RF transceiver and the digital processing circuit are fabricated on a single integrated circuit chip.

53. The mobile phone as recited in claim 52, wherein at least a portion of the first timing circuit is disabled during the active mode of operation of the RF transceiver.

54. The mobile phone as recited in claim 53, wherein portions of the digital processing circuit in addition to the first timing circuit are disabled during the active mode of operation of the RF transceiver.

55. The mobile phone as recited in claim 54, wherein the portions of the digital processing circuit are disabled in response to a signal generated by the second timing circuit.

56. The mobile phone as recited in claim 53, wherein the at least a portion of the first timing circuit is disabled in response to a signal generated by the second timing circuit.

57. The mobile phone as recited in claim 53, wherein the at least a portion of the first timing circuit is disabled by a signal that disables one or more clocks that clock the first timing circuit.

58. The mobile phone as recited in claim 53, wherein the at least a portion of the first timing circuit disabled during the active mode of operation of the RF transceiver is enabled during the shutdown mode of operation of the RF transceiver.

59. The mobile phone as recited in claim 58, wherein the at least a portion of the first timing circuit is enabled in response to a signal generated by the second timing circuit.

60. The mobile phone as recited in claim 53, wherein the second timing circuit is configured to provide the timed signals during the active mode of operation of the RF transceiver in response to a signal indicative of a change from the shutdown mode of operation of the RF transceiver to the active mode of operation of the RF transceiver.

61. The mobile phone as recited in claim 60, wherein the signal indicative of the change from the shutdown mode of operation of the RF transceiver to the active mode of operation of the RF transceiver is provided by the first timing circuit.

* * * * *